United States Patent [19]

Bruce

[11] 3,859,281
[45] Jan. 7, 1975

[54] 2,6-DICHLOROBENZYLIDENEHYDRAZIDES

[75] Inventor: William F. Bruce, Havertown, Pa.

[73] Assignee: American Home Products Corporation, New York, N.Y.

[22] Filed: Jan. 26, 1973

[21] Appl. No.: 326,727

Related U.S. Application Data

[62] Division of Ser. No. 159,056, July 1, 1971, Pat. No. 3,746,703.

[52] U.S. Cl............. 260/240 G, 424/251, 424/263, 424/264, 424/274, 424/320, 260/465 D, 260/558 H, 260/559 H, 260/562 H

[51] Int. Cl............................................. C09b 23/00

[58] Field of Search................. 260/240 G, 562 H

[56] References Cited
UNITED STATES PATENTS 2,750,388   6/1956   Yale........................... 260/240 G X 3,746,703   7/1973   Bruce.............................. 260/562 H

FOREIGN PATENTS OR APPLICATIONS 946,803   8/1956   Germany ........................ 260/240 G

OTHER PUBLICATIONS

Offe et al., II, Z. Naturforsch, Vol. 7B, pp. 446–462, (1952).
Popp, J. Med. Chem., Vol. 13, p. 1017–1018, (1970).
Chemical Abstracts, Vol. 67, abst. No. 82098 h, (Abst. of Spanish Patent 324,608).
Alemany et al., Bull. Soc. Chim., France 1966, p. 2486–2497.

*Primary Examiner*—John D. Randolph
*Attorney, Agent, or Firm*—Richard K. Jackson

[57] ABSTRACT

Novel derivatives of 2,6-dichlorobenzylidenehydrazides have been prepared which have useful pharmacological activity.

2 Claims, No Drawings

2,6-DICHLOROBENZYLIDENEHYDRAZIDES

This is a division of application Ser. No. 159,056, filed July 1, 1971 and now U.S. Pat. No. 3,746,703 issued July 17, 1973.

DESCRIPTION OF THE INVENTION

This invention is concerned with novel pharmaceutical compounds of FORMULA I:

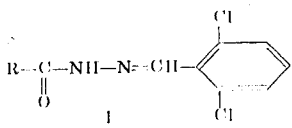

wherein R is selected from the group consisting of alkyl of 1 to about 10 carbon atoms, hydroxyalkyl, alkenyl, alkynyl, (lower)alkylthio(lower)alkyl, di(lower)alkylamino(lower)alkyl, thienyl, pyridyl, aminopyridyl, piperidyl, pyridyl(lower)alkyl, (lower)alkoxy(lower)alkyl, cyanoalkyl, cinnamyl, hydrazino, phenyl hydroxy(lower)alkyl,

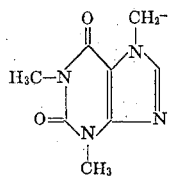 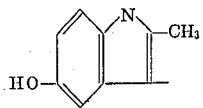

and

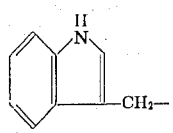 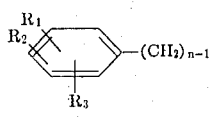

wherein $R_1$, $R_2$ and $R_3$ are independently selected from the group consisting of hydrogen, halogen, hydroxy(lower)alkoxy, amino and (lower)alkyl and n is an integer from 1 to 6.

The compounds of the invention are prepared by the admixture of 2,6-dichlorobenzaldehyde with the appropriate substituted hydrazide derivative in the presence of an organic solvent.

The compounds of FORMULA I of this invention have been found to exert a depressant action on the central nervous system when tested under standard and accepted pharmacological procedures, in animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with central nervous system depressant agents. Specifically the compounds may be employed to induce a calming effect in mammals.

In the pharmacological evaluation of the biological activity of the compounds of this invention, the in vivo effects were tested as follows: The compound was administered orally to three mice (14 to 24 grams) at each of the following doses:
400, 127, 40 and 12.7 milligrams per kilogram of host body weight (MPK). The animals were watched for a minimum of two hours during which time signs of general stimulation, (i.e. increased spontaneous motor activity, hyperactivity or tactile stimulation, twitching) general depression (i.e., decreased spontaneous motor activity, decreased respiration), autonomic activity (i.e., miosis, mydriasis, diarrhea) were noted.

The compounds of this invention induce central nervous system depressant effects at a dose of about 40 to about 400 MPK.

In addition to the above-described depressant activity many of the compounds possess useful hypotensive activity in mammals such as rats, at a dosage level of 10-100 milligrams per Kg. of body weight P.O. Among those compounds which possess this activity are the following:

2,6-dichlorobenzylidene isonicotinic acid hydrazide;
2,6-dichlorobenzylidene nicotinic acid hydrazide;
2,6-dichlorobenzylidene butyric acid hydrazide;
2,6-dichlorobenzylidene 2-methyllactic acid hydrazide;
2,6-dichlorobenzylidene 3-methylthiopropionic acid hydrazide;
2,6-dichlorobenzylidene picolinic acid hydrazide;
2,6-dichlorobenzylidene 3-pyridineacetic acid hydrazide;
2,6-dichlorobenzylidene propionic acid hydrazide;
2,6-dichlorobenzylidene diethylaminoacetic acid hydrazide;
2,6-dichlorobenzylidene 2-pyridineacetic acid hydrazide;
2,6-dichlorobenzylidene valeric acid hydrazide;
2,6-dichlorobenzylidene hexanoic acid hydrazide;
2,6-dichlorobenzylidene 6-aminonicotinic acid hydrazide;
2,6-dichlorobenyzlidene 3-ethoxypropionic acid hydrazide;
2,6-dichlorobenzylidene dimethylaminoacetic acid hydrazide;
2,6-dichlorobenzylidene lactic acid hydrazide;
2,6-dichlorobenzylidene formic acid hydrazide; and
2,6-dichlorobenzylidene isobutyric acid hydrazide.

When the compounds of the invention are administered for the purpose of inducing a therapeutic effect, they may be administered in combination with suitable diluents, solvents, excipients or carriers according to standard pharmaceutical practice. Suitable methods of preparing such compositions are well-known to those skilled in the art. The carriers may be selected from the group comprising lactose, sucrose, dextrose, starch, calcium carbonate or any other suitable ingredient. Other ingredients and materials for preparing oral or parenteral dosages forms may be found in the text titled, Remington's Practice of Pharmacy, 9th Ed., Mack Pub. Co., Easton, Pa. (1948) or any other standard reference work.

Many of the starting materials are commercially available or may be prepared by according to methods set forth in the literature or as disclosed in the specific embodiments herein.

The following examples are given by way of illustration and are not construed as limitations of this invention, many variations of which are possible without departing from the scope and spirit thereof.

EXAMPLE I 2,6-Dichlorobenzylidene isonicotinic acid hydrazide

A solution of 9 g. of 2,6-dichlorobenzaldehyde in 40 ml of ethanol, with 7 g. of isonicotinic hydrazide in 15 ml of acetic acid, heated 2 hours on a steam bath, gave on addition of 50 ml of water 13 g. of white fibrous crystals, m.p. 213°-4°.

Anal. Calcd for $C_{13}H_9Cl_2N_3O$: C, 53.08; H, 3.08; Cl, 24.11; N, 14.29.
Found: C, 52.85; H, 3.00; Cl, 24.14; N, 14.19.

EXAMPLE II 2,6-Dichlorobenzylidene salicylic acid hydrazide

A solution of 8 g. of 2,6-dichlorobenzaldehyde in 30 ml of ethanol was filtered hot into a solution of 7 g. of salicyl hydrazide in 60 ml of ethanol, giving a clear solution which soon deposited 12 g. of glistening white platelets, m.p. 216°–7°.

Anal. Calcd for $C_{14}H_{10}Cl_2N_2O_2$: C, 54.39; H, 3.26; Cl, 22.94; N, 9.06.
Found: C, 54.36; H, 3.32; Cl, 22.94; N, 9.01.

EXAMPLE III 2,6-Dichlorobenzylidene nicotinic acid hydrazide

A solution of 5 g. of 2,6-dichlorobenzaldehyde in 30 ml of ethanol, with 5 g. of nicotinic hydrazide in 25 ml of ethanol heated 20 minutes on a steam bath gave 9 g. of white needles, m.p. 209°–10°.

Anal. Calcd for $C_{13}H_9Cl_2N_3O$: C, 53.08; H, 3.08; Cl, 24.11; N, 14.24.
Found: C, 53.04; H, 3.12; Cl, 23.94; N, 14.60.

EXAMPLE IV 2,6-Dichlorobenzylidene benzoic acid hydrazide

A solution of 3.5 g. of 2,6-dichlorobenzaldehyde in 30 ml of ethanol, with 2.5 g. of benzoylhydrazine in 30 ml of ethanol, was warmed on a steam bath to give 6 g. of flaky white crystals, m.p. 226°–7°.

Anal. Calcd for $C_{14}H_{10}Cl_2N_2O$: C, 57.36; H, 3.44; Cl, 24.19; N, 9.56.
Found: C, 57.04; H, 3.64; Cl, 24.34; N, 9.41.

EXAMPLE V 2,6-Dichlorobenzylidene p-anisic acid hydrazide

A solution of 5 g. of 2,6-dichlorobenzaldehyde in 30 ml of ethanol, with 4 g. of p-anisoylhydrazine in 30 ml of ethanol rapidly gave 8 g. of fibrous white crystals, m.p. 224°–5°.

Anal Calcd for $C_{15}H_{12}Cl_2N_2O_2$: C, 55.74; H, 3.74; Cl, 21.94; N, 8.67.
Found: C, 55.61; H, 3.88; Cl, 21.91; N, 8.40.

EXAMPLE VI 2,6-Dichlorobenzylidene anthranilic acid hydrazide

A solution of 5 g. of 2,6-dichlorobenzaldehyde in 30 ml of ethanol, with 4.5 g. of anthraniloylhydrazine in 30 ml of ethanol heated on a steam bath soon gave a voluminous white precipitate, m.p. 237°–8°; 7 g.

Anal. Calcd for $C_{14}H_{11}Cl_2N_3O$: C, 54.56; H, 3.60; Cl, 23.01; N, 13.64.
Found: C, 54.43; H, 3.78; Cl, 23.02; N, 13.69.

EXAMPLE VII 2,6-Dichlorobenzylidene cinnamic acid hydrazide

A solution of 10 g. of 2,6-dichlorobenzaldehyde in 30 ml of ethanol with 10 g. of cinnamoylhydrazine in 30 ml of ethanol, heated on a steam bath gave 3 g. of yellow needles, m.p. 229°–30°.

Anal. Calcd for $C_{16}H_{12}Cl_2N_2O$: C, 60.11; H, 3.79; Cl, 22.18; N, 8.77.
Found: C, 59.83; H, 3.85; Cl, 22.00; N, 8.90.

EXAMPLE VIII 2,6-Dichlorobenzylidene acetic acid hydrazide

A solution of 5 g. of 2,6-dichlorobenzaldehyde in 30 ml of ethanol with 4.5 g. of acetylhydrazine in 30 ml of ethanol heated 15 minutes on a steam bath gave on cooling and seeding 5.5 g. of fine white needles, m.p. 201°–2°.

Anal. Calcd for $C_9H_8Cl_2N_2O$: C, 46.76; H, 3.49; Cl, 30.68; N, 12.12.
Found: C, 46.52; H, 3.51; Cl, 30.44; N, 12.39.

EXAMPLE IX 2,6-Dichlorobenzylidene butyric acid hydrazide

A solution of 10 g. of 2,6-dichlorobenzaldehyde in 60 ml of ethanol with 7 g. of butyroylhydrazine in 40 ml of ethanol heated briefly on a steam bath gave 11 g. of light yellow needles, m.p. 154°–5°.

Anal. Calcd for $C_{11}H_{12}Cl_2N_2O$: C, 50.98; H, 4.67; N, 10.81.
Found: C, 50.62; H, 4.38; N, 10.69.

EXAMPLE X 2,6-Dichlorobenzylidene 2-methyllactic acid hydrazide

A mixture of 12 g. of methyl 2-hydroxyisobutyrate and 5 g. of hydrazine hydrate was heated at 110° for two hours, then to 140° for 10 minutes gave on cooling 9 g. of white granular crystals of 2-methylacetylhydrazine which was recrystallized from ethanol, m.p. 98.9°.

Anal. Calcd for $C_4H_{10}N_2O_2$: C, 40.66; H, 8.53; N, 23.71.
Found: C, 40.78; H, 8.44; N, 23.70.

A solution of 5 g. of this compound in 35 ml of ethanol with 7 g. of 2,6-dichlorobenzaldehyde in 30 ml of ethanol heated 20 minutes on a steam bath gave on long standing 8 g. of shiny white microcrystals, m.p. 205°–6°.

Anal. Calcd for $C_{11}H_{12}Cl_2N_2O_2$: C, 48.02; H, 4.40; Cl, 25.77; N, 10.18.
Found: C, 48.13; H, 4.39; Cl, 25.62; N, 10.06.

EXAMPLE XI 2,6-Dichlorobenzylidene 3-methylthiopropionic acid hydrazide

A mixture of 14 g. of methyl 3-methylthiopropionate and 6 ml of hydrazine hydrate with 10 ml of toluene heated gradually to 140° gave when cooled a solid (10 g.) which was crystallized from isopropanol to give 8 g. of white crystals, m.p. 158°–9° after drying.

A solution of 5 g. of this compound in 25 ml of ethanol with 6.5 g. of 2,6-dichlorobenzaldehyde heated briefly on a steam bath gave 5 g. of fluffy white crystals, m.p. 148°–9°.

Anal. Calcd for $C_{11}H_{12}Cl_2N_2OS$: C, 45.37; H, 4.16; Cl, 24.35; N, 9.62; S, 11.01.
Found: C, 45.20; H, 4.31; Cl, 24.14; N, 9.26; S, 10.94.

EXAMPLE XII 2,6-Dichlorobenzylidene picolinic acid hydrazide

A solution of 6 g. of picolinoylhydrazine in 25 ml of ethanol with 8.5 g. of 2,6-dichlorobenzaldehyde in 25 ml of ethanol, heated for 10 minutes on a steam bath gave 11 g. of white fibrous crystals, m.p. 209°–10°.

Anal. Calcd for $C_{13}H_9Cl_2N_3O$: C, 53.08; H, 3.08; Cl, 24.11; N, 14.26.
Found: C, 52.86; H, 3.16; Cl, 24.21; N, 14.15.

EXAMPLE XIII 2,6-Dichlorobenzylidene 3,4,5-trimethoxybenzoic acid hydrazide

A solution of 4 g. of 2,6-dichlorobenzaldehyde in 30 ml of ethanol, with 5 g. of 3,4,5-trimethoxybenzoylhydrazine in 30 ml of ethanol, heated 10 minutes on a steam bath, gave 10 g. of fibrous white crystals, m.p. 224°–5°.

Anal. Calcd for $C_{17}H_{16}Cl_2N_2O_4$: C, 53.28; H, 4.21; Cl, 18.51; N, 7.30.
Found: C, 53.07; H, 4.19; Cl, 18.48; N, 7.06.

EXAMPLE XIV 2,6-Dichlorobenzylidene 3-pyridineacetic acid hydrazide

A solution of 5 g. of 3-pyridineacetylhydrazine in 40 ml of ethanol, with 7 g. of 2,6-dichlorobenzaldehyde in 40 ml of ethanol, heated 15 minutes on a steam bath, gave 6 g. of fine white crystals, m.p. 199°–200°.

Anal. Calcd for $C_{14}H_{11}Cl_2N_3O$: C, 54.56; H, 3.60; Cl, 23.01; N, 13.64.
Found: C, 54.47; H, 3.66; Cl, 23.31; N, 13.54.

EXAMPLE XV 2,6-Dichlorobenzylidene propionic acid hydrazide

A solution of 5 g. of propionylhydrazine in 25 ml of ethanol with 6 g. of 2,6-dichlorobenzaldehyde in 25 ml of ethanol heated 20 minutes on a steam bath gave 5 g. of white fibrous crystals, with a yellowish cast in the shadows, m.p. 171°–2°.

Anal. Calcd for $C_{10}H_{10}Cl_2N_2O$: C, 49.00; H, 4.11; N, 11.43.
Found: C, 48.88; H, 4.03; N, 11.25.

EXAMPLE XVI 2,6-Dichlorobenzylidene diethylaminoacetic acid hydrazide

A solution of 6.5 g. of 2,6-dichlorobenzaldehyde with 5 g. of diethylaminoacetylhydrazine in 50 ml of ethanol, heated 15 minutes on a steam bath gave after standing in an evaporating dish 6 g. of white needles, m.p. 94°–5°.

Anal. Calcd for $C_{13}H_{17}Cl_2N_3O$: C, 51.67; H, 5.67; Cl, 23.46; N, 13.91.
Found: C, 51.56; H, 5.42; Cl, 23.61; N, 13.76.

EXAMPLE XVII 2,6-Dichlorobenzylidene p-hydroxybenzoic acid hydrazide

A solution of 5 g. of p-hydroxybenzoylhydrazine in 20 ml of ethanol, 15 ml of water and 30 ml of dimethyl fomamide, with 6 g. of 2,6-dichlorobenzaldehyde in 30 ml of ethanol heated 1 hour on a steam bath, then diluted with about three volumes of water to incipient turbidity, deposited 8 g. of white powdery crystals which melted at 209°–210° after crystallization from ethanol and dehydration at 150°.

Anal. Calcd for $C_{14}H_{10}Cl_2N_2O_2$: C, 54.39; H, 3.26; N, 9.06.
Found: C, 54.38; H, 3.30; N, 9.00.

EXAMPLE XVIII 2,6-Dichlorobenzylidene p-aminobenzoic acid hydrazide

A solution of 6 g. of p-aminobenzoic acid hydrazide in 50 ml of ethanol with 7 g. of 2,6-dichlorobenzaldehyde in 30 ml of ethanol heated 10 minutes on a steam bath gave 8 g. of tiny yellowish plates, m.p. 248°–9°.

Anal. Calcd for $C_{14}H_{11}Cl_2N_3O$: C, 54.56; H, 3.60; Cl, 23.01; N, 13.64.
Found: C, 54.32; H, 3.76; Cl, 22.96; N, 13.44.

EXAMPLE XIX 2,6-Dichlorobenzylidene mandelic acid hydrazide

A solution of 5 g. of mandelic acid hydrazide in 20 ml of ethanol, with 6.5 g. of 2,6-dichlorobenzaldehyde in 30 ml of ethanol heated half an hour on a steam bath gave 8 g. of white powdery crystals, m.p. 206°–7°.

Anal. Calcd for $C_{15}H_{12}Cl_2N_2O_2$: C, 55.74; H, 3.74; N, 8.67.
Found: C, 55.42; H, 3.87; N, 8.84.

EXAMPLE XX 2,6-Dichlorobenzylidene 2-pyridineacetic acid hydrazide

A solution of 4 g. of 2-pyridineacetic acid hydrazide in 30 ml of ethanol, with 5 g. of 2,6-dichlorobenzaldehyde in 30 ml of ethanol, heated 10 minutes on a steam bath, gave 6.5 g. of yellow needles, m.p. 215°–6°.

Anal. Calcd for $C_{14}H_{11}Cl_2N_3O$: C, 54.56; H, 3.60; Cl, 23.01; N, 13.64.
Found: C, 54.57; H, 3.74; Cl, 23.00; N, 13.91.

EXAMPLE XXI 2,6-Dichlorobenzylidene 1,2,3,6-tetrahydro-1,3-dimethyl-2,6-dioxopurine-7-acetic acid hydrazide A solution of 4 g. of 7-theophylline acetic acid hydrazide in 20 ml of ethanol with 15 ml of 6 N hydrochloric acid and 30 ml of water, with 5 g. of 2,6-dichlorobenzaldehyde in 25 ml of ethanol, heated 1 minute on a steam bath, gave 5 g. of white precipitate with yellowish sheen, m.p. 295°–6°.

Anal. Calcd for $C_{16}H_{14}Cl_2N_6O_3$: C, 46.96; H, 3.45; N, 20.54.
Found: C, 46.68; H, 3.52; N, 20.32.

EXAMPLE XXII 2,6-Dichlorobenzylidene 5-hydroxy-2-methylindole-3-carboxylic acid hydrazide A solution of 4 g. of 5-hydroxy-2-methylindole-3-carboxylic acid hydrazide in 20 ml of ethanol and 15 ml of dimethylformamide, with 5 g. of 2,6-dichlorobenzaldehyde in 30 ml of ethanol, combined hot, gave 4.5 g. of tan powder, m.p. 316°–7°.

Anal. Calcd for $C_{17}H_{13}Cl_2N_3O_2$: C, 56.37; H, 3.61; N, 11.63.
Found: C, 56.66; H, 3.98; N, 11.38.

EXAMPLE XXIII 2,6-Dichlorobenzylidene valeric acid hydrazide

A solution of 2 g. of valeric acid hydrazide in 25 ml of ethanol, with 4 g. of 2,6-dichlorobenzaldehyde in 20 ml of ethanol, heated 20 minutes on a steam bath, gave on seeding 5 g. of yellow-white needles, m.p. 145°–6°.

Anal. Calcd for $C_{12}H_{14}Cl_2N_2O$: C, 52.76; H, 5.17; Cl, 25.96; N, 10.26.
Found: C, 52.64; H, 4.98; Cl, 26.03; N, 10.12.

EXAMPLE XXIV 2,6-Dichlorobenzylidene indole-3-acetic acid hydrazide

A solution of 4 g. of indole-3-acetic acid hydrazide in 20 ml of ethanol, with 4 g. of 2,6-dichlorobenzaldehyde in 25 ml of ethanol, heated 10 minutes on a steam bath, gave 8 g. of white powder, m.p. 214°–5°.

Anal. Calcd for $C_{17}H_{13}Cl_2N_3O$: C, 58.97; H, 3.78; Cl, 20.48; N, 12.14.

Found: C, 58.93; H, 4.06; Cl, 20.20; N, 12.13.

EXAMPLE XXV 2,6-Dichlorobenzylidene heptanoic acid hydrazide

A solution of 2 g. heptanoic acid hydrazide, m.p. 81°–2°, in 20 ml of ethanol, with 4 g. of 2,6-dichlorobenzaldehyde in 20 ml of ethanol gave after 1 hour on a steam bath and concentration in a crystallizing dish 3 g. of yellowish rosettes, m.p. 134°–5°.

Anal. Calcd for $C_{14}H_{18}Cl_2N_2O$: C, 55.82; H, 6.02; Cl, 23.24; N, 9.30.

Found: C, 55.61; H, 5.96; Cl, 23.77; N, 9.20.

EXAMPLE XXVI 2,6-Dichlorobenzylidene 2-thiophenecarboxylic acid hydrazide

A solution of 5 g. of 2-thiophenecarboxylic acid hydrazide in 30 ml of ethanol, with 6 g. of 2,6-dichlorobenzaldehyde in 30 ml of ethanol, heated half an hour on a steam bath gave on cooling 5 g. of white granular crystals, m.p. 202°–3°.

Anal. Calcd for $C_{12}H_8Cl_2N_2OS$: C, 48.17; H, 2.70; Cl, 23.70; N, 9.36; S, 10.72.

Found: C, 48.51; H, 2.97; Cl, 23.48; N, 9.37; S, 10.43.

EXAMPLE XXVII 2,6-Dichlorobenzylidene hexanoic acid hydrazide

A solution of 5 g. of hexanoic acid hydrazide in 50 ml of ethanol with 7 g. of 2,6-dichlorobenzaldehyde in 30 ml of warm ethanol, heated 10 minutes on a steam bath, gave 11 g. of yellowish white powder, m.p. 161°–2°.

Anal. Calcd for $C_{13}H_{16}Cl_2N_2O$: C, 54.37; H, 5.62; Cl, 24.69; N, 9.67.

Found: C, 54.12; H, 5.45; Cl, 24.92; N, 9.65.

EXAMPLE XXVIII 2,6-Dichlorobenzylidene 6-aminonicotinic acid hydrazide

A solution of 6 g. of 6-aminonicotinic acid hydrazide in 30 ml of ethanol with 4 g. of 2,6-dichlorobenzaldehyde in 30 ml of ethanol heated 10 minutes on a steam bath gave 3 g. of white powder m.p. 210°–11°. On recrystallization from ethanol, the m.p. was raised to 219°–20°.

Anal. Calcd for $C_{11}H_{12}Cl_2N_2O$: C, 50.98; H, 4.67; Cl, 27.36; N, 10.81.

Found: C, 50.90; H, 4.65; Cl, 27.59; N, 10.83.

EXAMPLE XXIX 2,6-Dichlorobenzylidene o-fluorobenzoic acid hydrazide

A solution of 3.5 g. of o-fluorobenzoic acid hydrazide in 30 ml ethanol, with 3.5 g. of 2,6-dichlorobenzaldehyde in 20 ml of ethanol, heated 10 minutes on a steam bath, gave 5 g. of fluffy white cyrstals, m.p. 224°–5°.

EXAMPLE XXX 2,6-Dichlorobenzlidene isonipecotic acid hydrazide

A solution of 4 g. of isonipecotic acid hydrazide in 3 ml of ethanol, with 5 g. of 2,6-dichlorobenzaldehyde in 30 ml of ethanol, heated 10 minutes on the steam bath, gave 5.5 g. of yellowish white powder, m.p. 245°–6° d.

Anal. Calcd for $C_{13}H_{15}Cl_2N_3O$: C, 52.01; H, 5.04; Cl, 23.62; N, 13.83.

Found: C, 52.13; H, 5.26; Cl, b 23.98; N, 13.21.

EXAMPLE XXXI 2,6-Dichlorobenzylidene m-toluic acid hydrazide

A solution of 6 g. of m-toluic acid hydrazide in 30 ml of ethanol with 7 g. of 2,6-dichlorobenzaldehyde in 30 ml of ethanol, heated 10 minutes on a steam bath, gave 11 g. of white fibrous crystals, m.p. 245°–6°.

EXAMPLE XXXII 2,6-Dichlorobenzylidene 2-octynoic acid hydrazide

A solution of 3 g. of octynoic acid hydrazide, m.p. 201°–2°, made by heating ethyl 2-octynoate with hydrazine (Anal. Calcd for $C_8H_{14}N_2O$: C, 62.30; H, 9.15; N, 18.17. Found: C, 61.87; H, 9.11; N, 18.56), was heated 1 hour on a steam bath with 4.5 g. of 2,6-dichlorobenzaldehyde in 20 ml of ethanol to give 6 g. of organge-yellow precipitate, m.p. 194°–5°.

Anal. Calcd for $C_{15}H_{16}Cl_2N_2O$: C, 57.89; H, 5.18; Cl, 22.80; N, 9.00.

Found: C, 57.57; H, 5.38; Cl, 22.80; N, 9.01.

EXAMPLE XXXIII 2,6-Dichlorobenzylidene phenylacetic acid hydrazide

A solution of 5 g. of phenylacetic acid hydrazide in 20 ml of ethanol, with 6 g. of 2,6-dichlorobenzaldehyde in 30 ml of ethanol, heated 1 hour on a steam bath, gave 6 g. of white crystalline powder, m.p. 204°–5°.

Anal. Calcd for $C_{15}H_{12}Cl_2N_2O$: C, 58.65; H, 3.94; Cl, 23.08; N, 9.12.

Found: C, 58.69; H, 4.15; Cl, 22.89; N, 9.20.

EXAMPLE XXXIV 2,6-Dichlorobenzylidene 3,4-dimethylbenzoic acid hydrazide

A solution of 4 g. of 3,4-dimethylbenzoic acid hydrazide in 30 ml of ethanol, m.p. 123°–4°, made by heating ethyl 3,4-dimethylbenzoate with hydrazine (Anal. Calcd for $C_9H_{12}N_2O$: N, 17.06; Found: N, 16.52) with 5 g. of 2,6-dichlorobenzaldehyde in 25 ml of ethanol, heated 30 min on a steam bath, gave 6 g. of white fibrous product, m.p. 247°–8°.

Anal. Calcd for $C_{16}H_{14}Cl_2N_2O$: C, 59.82; H, 4.39; Cl, 22.08; N, 8.72.

Found: C, 59.82; H, 4.45; Cl, 21.96; N, 8.90.

EXAMPLE XXXV 2,6-Dichlorobenzylidene 3-ethoxypropionic acid hydrazide

A solution of 5 g. of crude 3-ethoxypropionic acid hydrazide, made by heating 3-ethoxypropionic acid ethyl ester with hydrazine, in 30 ml of ethanol, with 6 g. of 2,6-dichlorobenzaldehyde in 30 ml of ethanol gave at once a yellow precipitate, m.p. 155°–6°, the azine of the aldehyde, which was filtered off, and the filtrate was heated 2 hours on a steam bath, gave 2.5 g. of white needles, m.p. 133°–4°.

Anal. Calcd for $C_{12}H_{14}Cl_2N_2O_2$: C, 49.84; H, 4.77; N, 9.69

Found: C, 49.69; H, 4.51; N, 9.39.

EXAMPLE XXXVI 2,6-Dichlorobenzylidene dimethylaminoacetic acid hydrazide

A solution of 5 g. of dimethylaminoacetic acid hydrazide in 20 ml of ethanol, with 6 g. of 2,6-dichlorobenzaldehyde in 20 ml of hot ethanol, heated 10 minutes on a steam bath gave a small amount of yellow precipitate, m.p. 155°–6°, the azine, which was removed by filtration; the filtrate, in a crystallizing dish, gave 3 g. of white granular solid, m.p. 131°–2°.

Anal. Calcd for $C_{11}H_{13}Cl_2N_3O$: C, 48.19; H, 4.78; Cl, 25.87; N, 15.33.

Found: C, 48.08; H, 4.87; Cl, 25.89; N, 15.29.

EXAMPLE XXXVII 2,6-Dichlorobenzylidene lactic acid hydrazide

A solution of 7 g. of syrupy lactic acid hydrazide, containing some hydrazine, in 40 ml of ethanol with 10 g. of 2,6-dichlorobenzaldehyde in 40 ml of ethanol, heated 10 minutes on a steam bath, gave 2 g. of the azine, m.p. 153°–4°, which was removed by filtration. The filtrate in a crystallizing dish gave 7 g. of white flaky solid, m.p. 121°–2°.

Anal. Calcd for $C_{10}H_{10}Cl_2N_2O_2$: C, 46.00; H, 3.86; Cl, 27.16, N, 10.73.

Found: C, 45.89; H, 3.99; Cl, 27.39; N, 11.08.

EXAMPLE XXXVIII 2,6-Dichlorobenzylidene cyanoacetic acid hydrazide

A solution of 4 g. of cyanoacetic acid hydrazide in 40 ml of ethanol with 5 g. of 2,6-dichlorobenzaldehyde in 30 ml of ethanol, heated 10 minutes on a steam bath, gave 7 g. of buff powder, m.p. 219°–20° d.

Anal. Calcd for $C_{10}H_7Cl_2N_3O$: C, 46.90; H, 2.76; Cl, 27.69; N, 16.41.

Found: C, 46.82; H, 2.79; Cl, 27.49; N, 16.32.

EXAMPLE XXXIX 2,6-Dichlorobenzylidene formic acid hydrazide

A solution of 3 g. of formic acid hydrazide in 25 ml of ethanol, with 6 g. of 2,6-dichlorobenzaldehyde in 25 ml of ethanol, heated 10 minutes on a steam bath gave a fibrous white precipitate, 6 g., m.p. 165°–6°.

Anal. Calcd for $C_8H_6Cl_2N_2O$: C, 44.26; H, 2.79; Cl, 32.67; N, 12.91.

Found: C, 44.02; H, 2.84; Cl, 32.52; N, 13.12.

EXAMPLE XL 2,6-Dichlorobenzylidene isobutric acid hydrazide

A solution of 4 g. of isobutyric acid hydrazide in 20 ml of ethanol, with 5 g. of 2,6-dichlorobenzaldehyde in 25 ml of ethanol, heated 10 minutes on a steam bath, gave 3.5 g. of yellowish-white fluffy needles, m.p. 203°–4°.

Anal. Calcd for $C_{11}H_{12}Cl_2N_2O$: C, 50.98; H, 4.6; Cl, 27.36; N, 10.81.

Found: C, 50.90; H, 4.65; Cl, 27.59; N, 10.83.

EXAMPLE XLI 2,6-Dichlorobenzylidene carbohydrazide

A solution of 4 g. of 2,6-dichlorobenzaldehyde in 50 ml of ethanol was added slowly to 5 g. of carbohydrazide in 40 ml of water and 5 ml of acetic acid on a steam bath. On cooling, 2.3 g. of fluffy white crystals separated m.p. 310°d. Recrystallized from ethanol, this melted at 216°–7°.

Anal. Calcd for $C_8H_8Cl_2N_4O$: C, 38.88; H, 3.26; Cl, 28.70; N, 22.68.

Found: C, 38.86; H, 3.23; Cl, 28.90; N, 22.17.

I claim:

1. The compound which is: 2,6-dichlorobenzylidene 1,2,3,6-tetrahydro-1,3-dimethyl-2,6-dioxopurine-7-acetic acid hydrazide.

2. The compound which is: 2,6-dichlorobenzylidene indole-3-acetic acid hydrazide.

* * * * *